Feb. 23, 1937.　　　A. S. BARKLEY　　　2,071,317
AEROPLANE WING STRUCTURE
Filed Feb. 5, 1934　　　4 Sheets-Sheet 1

INVENTOR.
Archiebald S. Barkley
BY
Myron J. Dikeman
ATTORNEY.

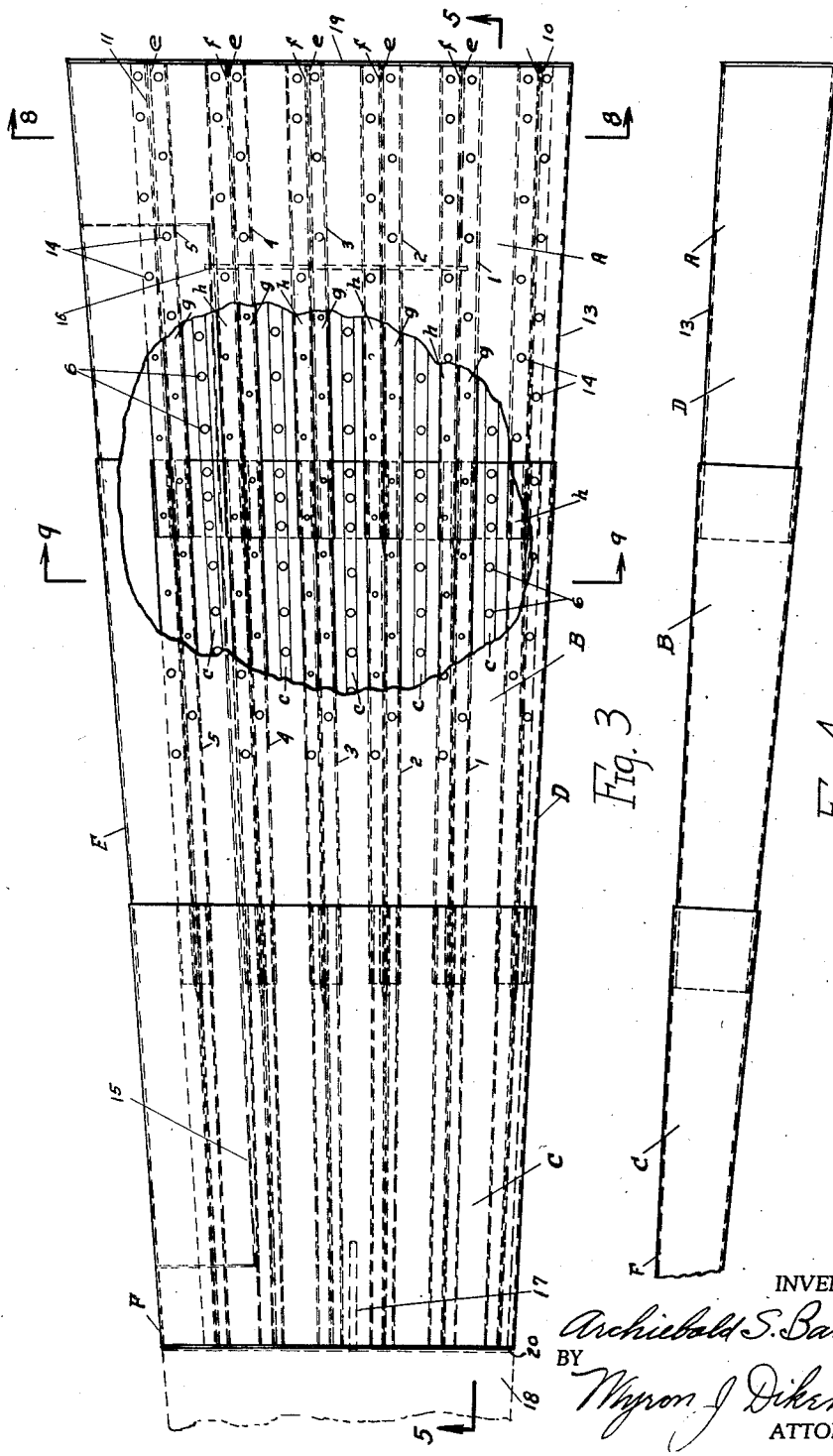

Feb. 23, 1937.     A. S. BARKLEY     2,071,317
AEROPLANE WING STRUCTURE
Filed Feb. 5, 1934     4 Sheets-Sheet 3

INVENTOR.
Archiebald S. Barkley
BY Myron J. Dikeman
ATTORNEY.

Feb. 23, 1937.   A. S. BARKLEY   2,071,317
AEROPLANE WING STRUCTURE
Filed Feb. 5, 1934   4 Sheets-Sheet 4

INVENTOR.
Archiebald S. Barkley
BY
Myron J. Diksman
ATTORNEY.

Patented Feb. 23, 1937

2,071,317

UNITED STATES PATENT OFFICE 2,071,317

AEROPLANE WING STRUCTURE

Archiebald S. Barkley, Detroit, Mich.

Application February 5, 1934, Serial No. 709,802

3 Claims. (Cl. 244—123)

My invention relates to a special wing structure for aeroplanes.

The object of my invention is to produce a light, strong wing construction that will eliminate the requirement for the heavy beam spar now commonly used in aeroplane structures, yet retain the strength and rigidity in the wing section both laterally and horizontally.

Another object is to produce a wing structure formed of flanged sheet metal segments, so designed and connected as to provide a plurality of connected, hollow tubular shaped spars the full width of the wing and extending the entire wing length, forming a full wing structure suitable for mounting the sheet metal wing covering, or skin, thereon.

A further object is to provide a wing structure that will result in a lighter, stronger and more rigid section, yet much thinner than the structure now in common use.

A still further object is to produce a multiple spar wing structure that is adapted to either straight or tapered wing sections, and to solid or adjustable wings, and applied to any type of plane.

A further object is to provide a wing structure that is simple in construction easily and efficiently assembled and that can be manufactured at a very low cost.

These several objects are attained in the preferred form by the construction and arrangement of parts more fully hereinafter set forth.

Similar parts on all drawings are marked by similar numerals or letters.

Fig. 3 is a plan view of one wing section stripped of both aileron and flipper, and showing the special arrangement of the various spar segments and means for splicing the wing sections together.

Fig. 4 is a front view of the wing section showing the taper formation and one means for connecting the wing sections together at the center.

Figure 1:
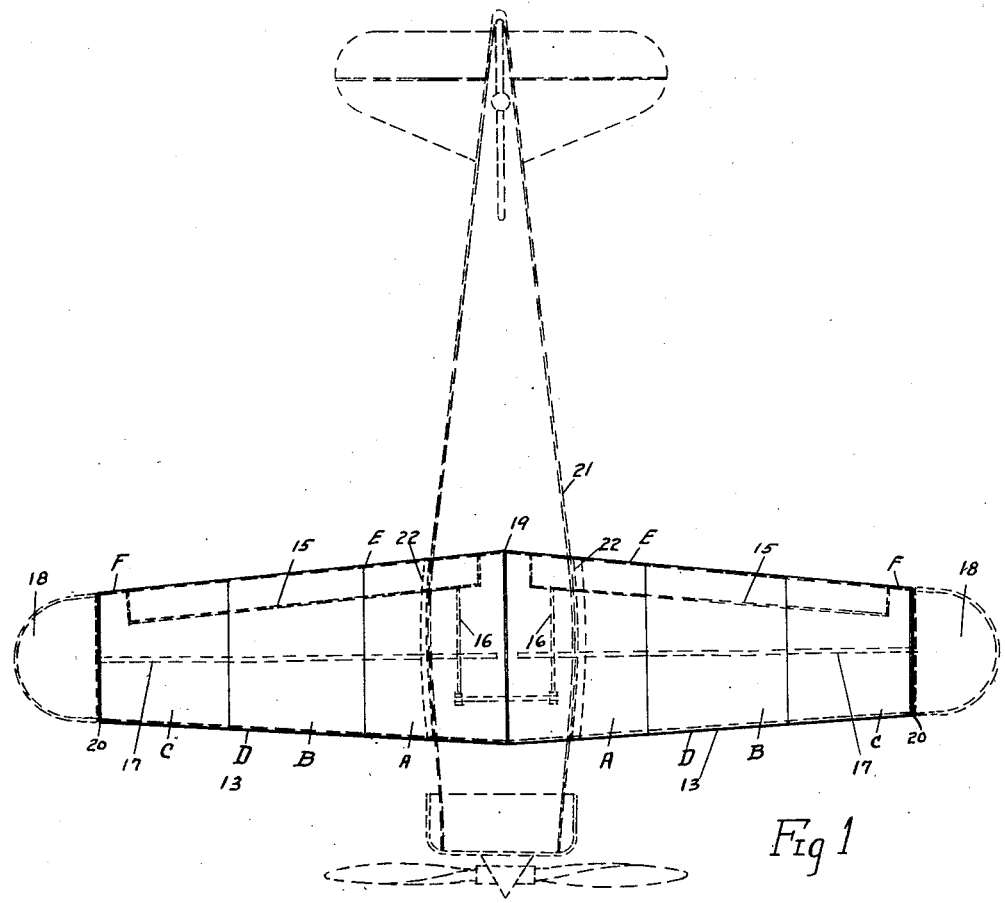
Fig. 1 is a plan view of an assembled wing section with an aeroplane body mounted thereon, showing the position of the various wing sections.

In general, my multiple spar wing structure comprises a series of fluted, flanged sheet metal trough sections, so designed and arranged and connected as to form a series of rigid, continuous box tube sections or spars, lengthwise of the wing, the flanged edges of the various segments being extended to form the wing contour and carry the sheet metal wing covering, or skin, securely attached thereto.

I will now describe more fully the detailed construction of my multiple spar structure, referring to the drawings and the marks thereon.

The preferred type of structure is illustrated in Figs. 3, 5, 8 and 9 of the drawings, comprising flat wall spar segments, fluted and flanged, and this type is more specifically described and illustrated herein, although it is to be understood other formations and shapes of spar segments may be used as well, if desired.

Figure 5:
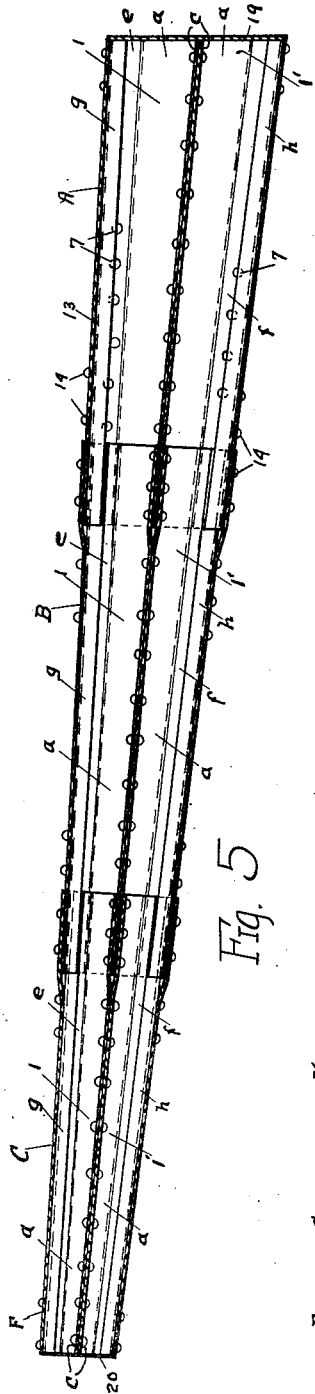
Fig. 5 is a vertical cross section lengthwise of the wing taken on the line 5—5 of Fig. 3 showing the interior spar segment construction.
Figure 8:
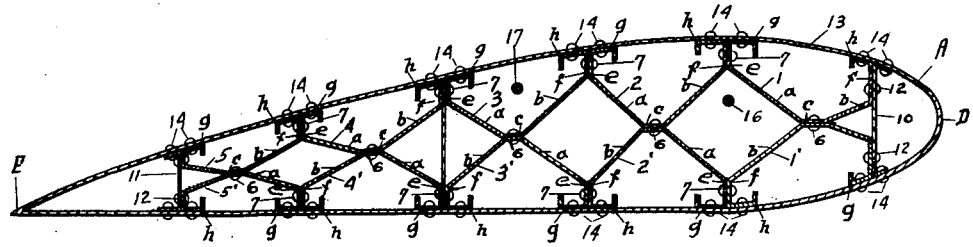
Fig. 8 is a cross sectional view of the wing taken on line 8—8 of Fig. 3 showing the detailed construction for assembling the various shaped spar segments forming a complete wing frame.
Figure 9:
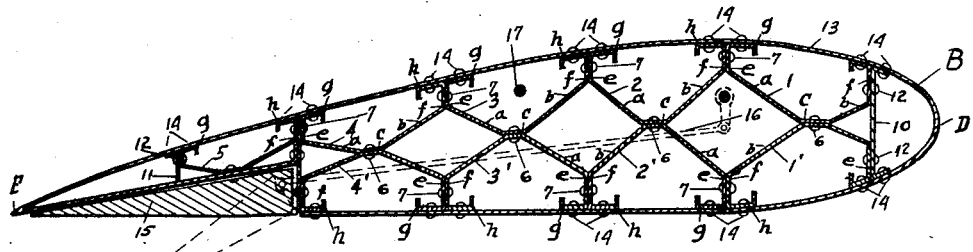
Fig. 9 is another cross section of the same wing taken on the line 9—9 of the Fig. 3 showing the adaptability of the wing section to either aileron or flipper members.

The wing body is preferably constructed in sections, herein illustrated as in three sections A, B, and C, joined together by spliced slip joints between the various flanged segments. The spar segments 1, 2, 3, 4, and 5 together with their respective counter spar segments 1', 2', 3', 4', and 5', are each made of sections of strong, light sheet metal suitable for aeroplane construction, the sheets being equal to the length of the respective body section A, B, or C with which they are to be used, and of sufficient width to be fluted and folded lengthwise into semi-V-shaped flanged sections, said sections preferably being formed with the side walls $a$ and $b$ formed with a center flat section $c$ therebetween, said side walls being extended forming oppositely positioned edge webs $e$ and $f$, and which carry formed thereon edge flanges $g$ and $h$, as illustrated in the Figs. 8 and 9 of the drawings. Each spar segment with its respective counter spar segment being positioned with its center section $c$ flat together and rigidly connected by rivets 6 spaced uniformly along the connecting walls, as illustrated in Figs. 3, and 8, and the respective adjacent segment edge webs $e$ and $f$ rigidly connected by the rivets 7 uniformly spaced along the connecting walls, as shown in Figs. 5 and 8 of the drawings, forming a connected, continuous multiple spar section throughout the entire width and length of the wing section. Further, the size, shape and the design of the fluted spar segments may be varied as desired, forming different shaped spar openings, and for meeting the requirements for different wing designs. Also any number of spar segment sections may be combined laterally for varying the width of the wing section, and where the thickness of the wing may demand, several tiers of spar units may be used and joined together laterally, by rivets or otherwise, although in my drawings I have illustrated a wing section with only two tiers of spar segments used therein. Along both the leading and trailing wing edges, are fixedly mounted baffle plates 10 and 11, securely riveted to the segment webs $e$ and $f$ by the rivets 12, and the sheet metal wing covering, or skin, 13 formed and mounted over the assembled spar segments for each wing section A B and C, providing a curved leading edge D and a V-shaped trailing edge E, as indicated in the Figs. 8, 9, 10 and 11 of the drawings. The wing covering 13 is securely attached to the segment flanges $g$ and $h$ by rivets 14, forming a complete, rigid wing section. Where the flipper 15, or an aileron if used in that position, requires, the last spar segments 5 and 5' may be omitted or cut through the section required, as indicated in the Fig. 9 of the drawings, otherwise the construction is similar throughout all wing sections.

The wing sections A, B and C are assembled in order by a slip fit of the respective adjacent spar ends, one within the other, as illustrated in Fig. 5, and all segments then riveted together, forming a continuous spar section the entire wing length, or they may be spliced by any other suitable means desired.

Figure 2:
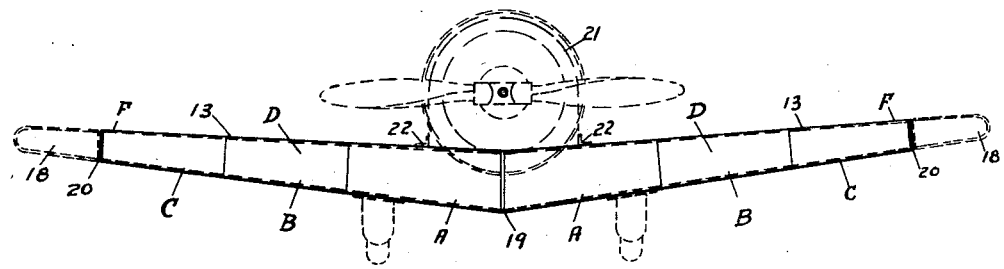
Fig. 2 is a front view of the assembled wings showing means for attaching the body section directly thereto, and the attaching means for the landing gear.

Suitable openings formed in the spar segments 2', 3', and 4' provide passageway for any operating rods 16 as may be extended therethrough leading to the flipper, or aileron, 15, for operaing same, also the hollow spar sections allow for ample passageway of any longitudinal operating bar or shaft 17 as may be extended lengthwise of the wing section, as for operating the wing tip ailerons 18 as illustrated in Figs. 1, 2 and 3 of the drawings.

Figure 7:
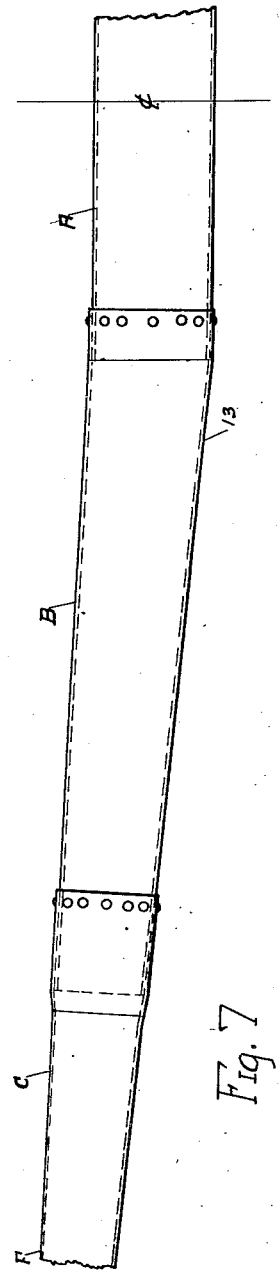
Fig. 7 is a front view of an assembled pair of wing sections, showing one structure for a continuous wing section, all made as a solid unit, and if desired with the horizontal center section as shown.

The assembled wing may be made in half sections as shown in the Figs. 3 and 5, and provided with center bulk head plates 19, as illustrated in the Fig. 5 of the drawings, and these sections then securely fastened together by bolt or rivet means, or any other suitable means, forming a continuous wing section, or the whole wing may be made as one continuous section by slip fit segment ends as previously described, and as illustrated in Fig. 7, the outer wing tip F being closed as may be required for the special structure applied, preferably using a flat end bulk head plate 20 should the wing tip ailerons be used.

The multiple spar wing structure results in sufficiently rigid formation, that any aeroplane body 21 may be mounted directly thereon, resting on the upper wing surface, or attached thereto from beneath, by any suitable means, herein illustrated by angle connections 22 securely riveted thereto, and the landing gear also attached accordingly.

Figure 6:
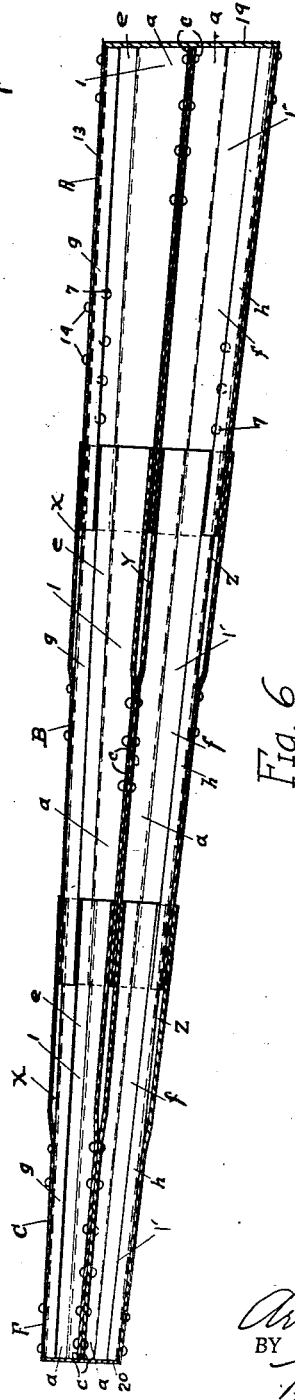
Fig. 6 is also a vertical sectional view taken on the same line 5—5 of Fig. 3, showing a modified form of the same arrangement of spar segments adapted to the slip or adjustable type of wing.

It is to be noted that this multiple spar construction is especially adapted for the slip or adjustable wing structure, by providing extended slip joint openings $x$, $y$ and $x$ between the segment sections, and which will allow the wing sections A, B and C to be readily telescoped or extended by the use of proper operating mechanism mounted therethrough. This adjustable wing is illustrated in Fig. 6 of the drawings, the remaining construction is the same as heretofore described.

The thickness, or gage of the sheet metal used may be readily varied throughout the wing structure, as the wing stresses will permit, lightening the metal gage for the successive adjacent spar segments from the front edge to the trailing edge, and the wing sections from the center towards the wing tips, thus providing a minimum weight wing having the maximum strength.

Figure 10:
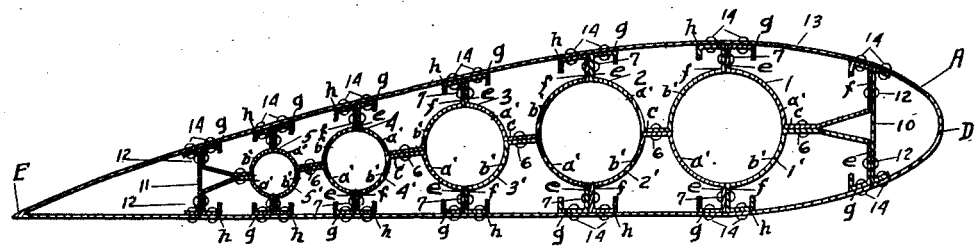
Fig. 10 illustrates a cross section as taken on the line 8—8 of Fig. 3 showing a modified form of one special shape for spar segments as may be substituted for the semi-rectangular type previously shown.

Fig. 10 shows a modified design of spar segments, using curved side walls $a'$ and $b'$, instead of the flat walls previously described. The assembled section results in a similar hollow spar section, except tubular, or conical in shape. This section is intended to illustrate any and all other formations, regardless of the resulting shape of the spar cross section.

Figure 11:
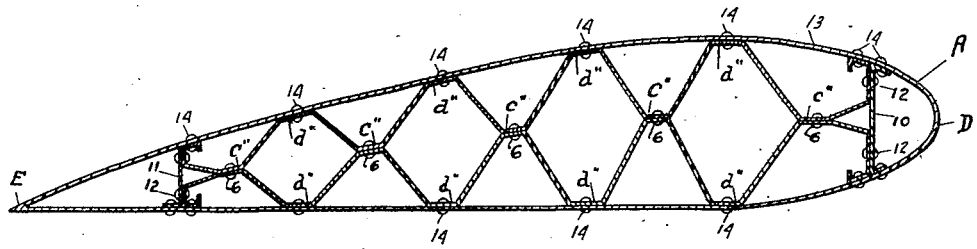
Fig. 11 is another cross section of the same wing taken on the line 8—8 of Fig. 3 illustrating a modified form of multiple spar structure, made by forming the spar segments of a single section of sheet metal extending the full wing width.

The Fig. 11 illustrates an alternate form of structure, producing a series of multiple spar sections by special fluting of a continuous sheet of sheet metal, having the similarly positioned central flat sections $c''$ formed successively thereacross and riveted together as in the former case, and the intervening outer flat sections $d''$ designed to engage the wing covering, or skin, and riveted thereto in a manner previously described for the segment flanges $g$ and $h$. The remaining assembling of the wing structure is the same as in the previous cases.

It is to be understood, that while I have illustrated my wing structure as a simple single type of wing, that any number of spar sections or tiers may be used, depending upon the size and shape of wing to be constructed, and that the various segments may be assembled by rivets as shown, or by any other suitable means such as welding etc.

Having fully described my multiple spar wing, what I claim as my invention and desire to secure by Letters Patent is;

1. An aeroplane wing structure comprising an upper stressed skin, a lower stressed skin, a vertical spar near the leading edge of the wing, a second vertical spar near the trailing edge of the wing, said vertical spars being spaced chordwise of the wing a substantial distance from the thickest portion thereof, and their depth at any section of the wing being substantially less than the greatest thickness of the wing at that section, and a shear transmitting web structure lying between said spars and secured to said skins, said web structure consisting entirely of intersecured longitudinally extending webs, said webs forming the walls of a series of adjacent four-cornered and four-sided tubular cells, each cell having an upper corner secured to the upper skin and a lower corner secured to the lower skin, the cells next to the spars each having its lateral corner adjacent thereto secured thereto and the remaining lateral corners of all of the cells being secured only to each other whereby to provide a homogeneous shear transmitting web structure in the space between said spars.

2. An aeroplane wing comprising an upper and a lower stressed skin and interconnected walls forming a plurality of polygonal cells, said skins being connected in the longitudinally extending region of greatest thickness entirely through the inter-connected walls of said plurality of polygonal cells, each cell having all of its walls diagonal with respect to both skins so that said diagonal walls transmit all of the interskin shear loads in said region.

3. An aeroplane wing comprising an upper and a lower stressed skin and continuous longitudinally extending webs forming cells of closed cross-section, no side of which lies along the wing surface, and connected along longitudinally extending lines to said skins, said webs lying at oblique dihedral angles to said skins and cooperating with said skins to form a chordwise extending truss structure, said webs forming paths for the transmission of longitudinal shear from one skin to the other and for the transmission of shear with a vertical component between the points of application of the aero-dynamic lifting forces and the load when the wing is functioning as a beam subjected to said forces and load, the distances from one skin to the other along all of the existing paths near the thickest part of any section of the wing being approximately equal so as to allow the deformation per inch under said shear along said various paths to be approximately equal, thus causing the shear stresses along said paths to be substantially uniform when the wing is loaded and efficiently utilizing the material forming said paths.

ARCHIEBALD S. BARKLEY.